United States Patent [19]
Howe

[11] 3,714,516
[45] Jan. 30, 1973

[54] METER SOCKET VOLTAGE RECORDER UNIT

[76] Inventor: Philip T. Howe, 4939 Warsaw Drive, Jackson, Mich. 49201

[22] Filed: Jan. 26, 1972

[21] Appl. No.: 220,999

[52] U.S. Cl. ................317/104, 317/106, 324/156, 317/111
[51] Int. Cl. ...............................................H02b 9/00
[58] Field of Search............................317/104–111; 324/156

[56] References Cited

UNITED STATES PATENTS

| | | |
|---|---|---|
| 1,905,262 | 4/1933 | Bradshaw..........................324/156 X |
| 2,429,093 | 10/1947 | Johansson............................317/109 |
| 2,866,936 | 12/1958 | Moore et al. .....................317/109 X |
| 3,170,090 | 2/1965 | Waldrop..............................317/104 |
| 3,549,951 | 12/1970 | Plummer...............................317/107 |
| 3,628,096 | 12/1971 | Drew et al. ...........................317/107 |

Primary Examiner—Richard B. Wilkinson
Assistant Examiner—Stanley J. Witkowski
Attorney—Beaman & Beaman

[57] ABSTRACT

The invention pertains to apparatus for monitoring metered electrical voltage to determine the possible existence of voltage fluctuations in electrical power supplied to customers by electric utility companies. The voltage recorder unit consists of a housing having an exteriorly projecting adapter receivable within a conventional electric meter socket upon removal of the meter therefrom, and the unit includes a meter socket into which the removed meter is inserted. A voltage recorder is located within the housing electrically connected to a circuit interconnecting the housing adapter and meter socket for sensing the voltage being metered. All conductors and electric terminals are located within the recorder unit housing, or the meter box or housing upon which the unit is supported, and an opening is defined in the unit housing through which the meter extends for reading purposes.

10 Claims, 8 Drawing Figures

PATENTED JAN 30 1973
3,714,516
SHEET 2 OF 2
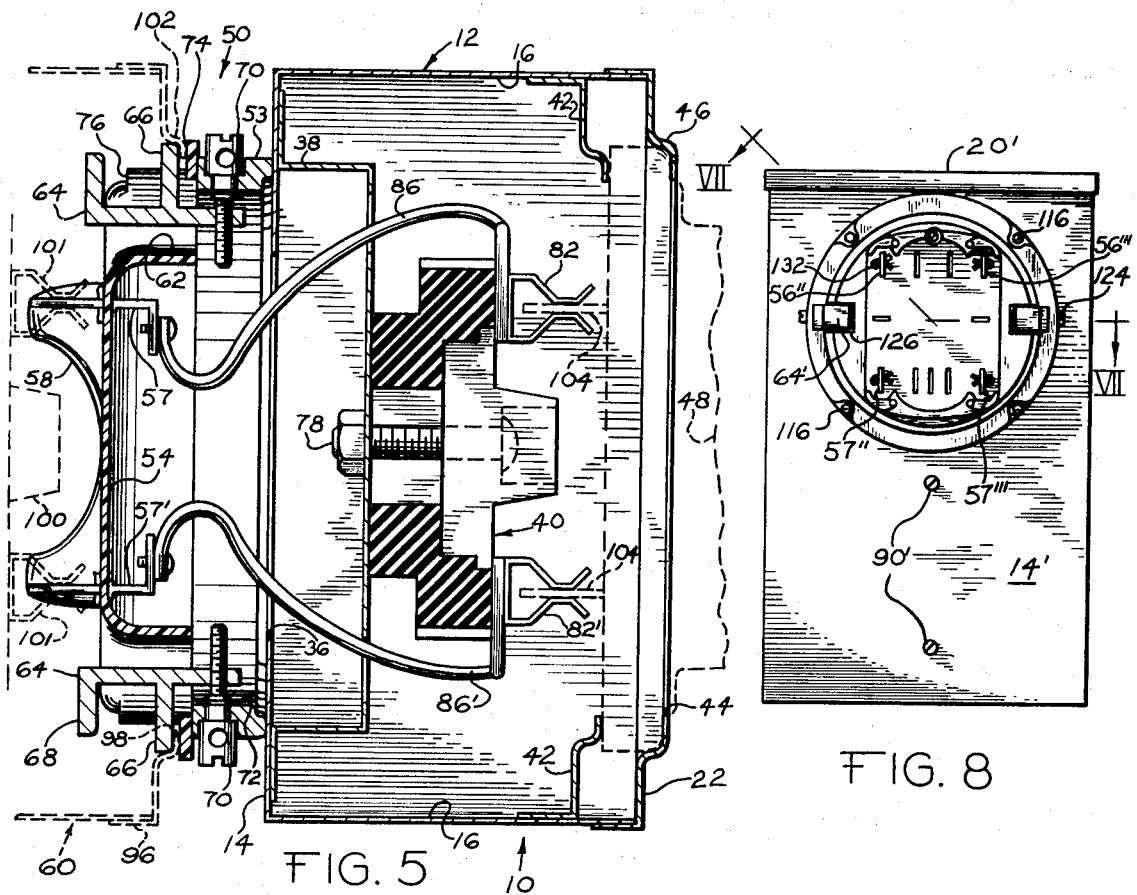
FIG. 5
FIG. 8
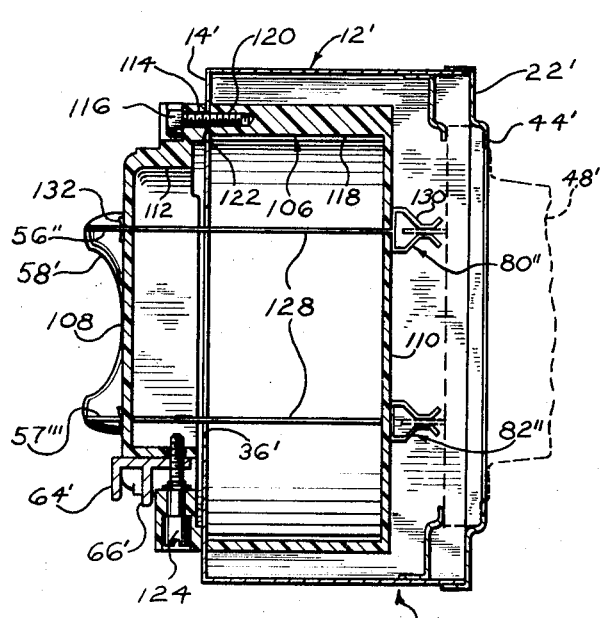
FIG. 7
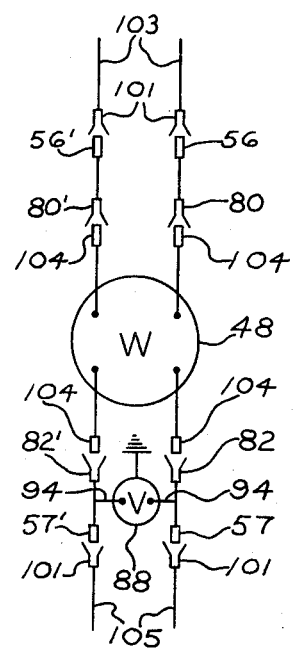
FIG. 6

METER SOCKET VOLTAGE RECORDER UNIT

BACKGROUND OF THE INVENTION

The invention pertains to self-contained voltage recorder units capable of monitoring metered electric power lines.

Electric utility companies supplying electrical power to consumers often encounter voltage variations at homes, factories, and other typical locations of electrical power consumption. The reason for line voltage fluctuations are many, such as inadequate or undercapacity wiring, insulation breakdown, faulty transformers, etc. Significant voltage variations can seriously damage electric motors and other electrical equipment, and the need to monitor line voltages often arises in the day to day operation of electric power companies.

As many voltage variation problems occur spasmodically, monitoring of the line voltage should occur over extended periods of time and thus a volt meter capable of continuously recording the voltage during a given time period is normally used for line voltage monitoring purposes. In view of the length of time that line voltage monitoring may occur, and for other reasons, it is necessary that metering of the electric power consumption simultaneously take place during voltage monitoring.

In the past, line voltage monitoring equipment consisted of a voltage recorder which was connected to the electrical supply lines for the customer being serviced. Interconnection to the supply lines by the voltage recorder usually occurs within building at the entrance or fuse box. The input conductors of the recorder unit are connected by clips, or other connecting means, to exposed electrical terminals or conducting portions within the entrance box and the voltage recorder is usually placed on the ground or floor below the entrance box with its conductors extending upwardly to the box. Entrance or fuse boxes include a front cover enclosing the box front, however, due to the presence of the voltage recorder unit conductors extending from the box to the recorder, the front cover cannot be firmly locked and in many instances, is entirely removed from the entrance box. Thus, during line voltage monitoring using conventional equipment the entrance box is open, or only partially enclosed, and is not locked. Additionally, a plurality of conductor wires extend from the box to the voltage recorder, and the recorder sits exposed on the floor below the entrance box.

The aforedescribed monitoring installations are undesirable in that the inability to lock or close the entrance box creates a potentially dangerous situation. Additionally, the presence of a plurality of small wire conductors extending from the meter box attracts attention, and the wires are susceptible to disturbance or damage. Additionally, the installation of conventional recorders exposes the installer to possible electrical shock.

SUMMARY OF THE INVENTION

It is the object of the invention to provide a self-contained voltage recorder unit for recording metered line voltages wherein the unit eliminates the need for leaving the entrance or fuse box open and eliminates exposed wiring and exposed voltage recorders. In the practice of the invention the unit is substituted for the electrical watthour meter of the system being monitored, and the removed electrical meter is reinstalled upon the unit during the monitoring period. The voltage recorder unit is, therefore, usually located outdoors, and may be installed and read without entering the building being serviced.

The voltage recorder unit includes a housing having a rear wall from which projects an adapter capable of being received within a conventional meter socket located in an energized meter box. Internally, the housing includes a meter socket for receiving an electrical meter, and electrical conductors interconnect the adapter and socket mounted upon the housing. The housing includes means for mounting an electric meter upon the meter socket, and a voltage recorder mounted within the housing is electrically connected to the conductors interconnecting the adapter and meter socket whereby upon the installation of a watt-hour meter in the unit meter socket simultaneous metering of electrical current being consumed occurs with the voltage monitoring by a recording voltage meter. All of the necessary conductors are located within the housing, and only the unit adapter, and the electrical meter once placed upon the unit, extend from the housing.

The adapter may be locked to the existing permanent meter box, and a front cover defined upon the housing unit having a hole defined therein through which the meter extends is capable of being locked to the housing in order to prevent tampering with the recorder or assembly.

Installation of a recorder unit in accord with the invention requires only that the existing electrical watthour meter be removed from its socket and the recorder unit adapter be inserted into the conventional meter socket. Thereupon, the removed meter is inserted into the meter socket mounted on the housing unit, and the recorder is adjusted to begin voltage recordation. The remounted meter extends from the recorder unit housing, and may therefor be read in the conventional manner.

The unit may be easily removed from the system being monitored by removing the meter from the unit socket, and the unit adapter from the permanent meter socket. Thereupon, the meter is reinserted into its permanent meter socket, and the unit may then be used elsewhere. The unit may be left connected to the permanent meter box as long as necessary, and the construction and features of the unit render the unit as free from tampering and vandalism as the permanent meter box. As the recorder unit in accord with the invention has an appearance very similar to the permanent meter box, and is mounted thereon, the presence of the unit is not readily apparent to the casual observer, and thus is not likely to attract the attention of children and others who may distub and vandalize conventional voltage monitoring equipment.

By using a double channel recorder both energized power lines of a 220 volt AC primary supply system, as used with domestic housing, for instance, may be simultaneously metered and recorded.

Thus, the invention provides apparatus capable of recording line voltages by "tapping" into the permanent meter box, yet simultaneously metering the monitored voltage supply, and discourages tampering while improving the safety characteristics during installation and providing protection for the voltage recorder.

BRIEF DESCRIPTION OF THE DRAWINGS

The aforementioned objects and advantages of the invention will be appreciated from the following description and accompanying drawings wherein:

FIG. 5 is a plan, sectional view taken through the recorder unit along Section V—V of FIG. 1, the permanent meter socket components, and the meter mounted upon the unit socket being shown in dotted lines, FIG. 6 is a schematic circuit representation of the circuitry of the voltage recorder unit in accord with the invention, FIG. 7 is a sectional view similar to FIG. 5 illustrating another embodiment of the invention as taken along Section VII—VII of FIG. 8, and FIG. 8 is a rear elevational view of the embodiment of FIG. 7.

DESCRIPTION OF THE PREFERRED EMBODIMENTS

Figure 1:
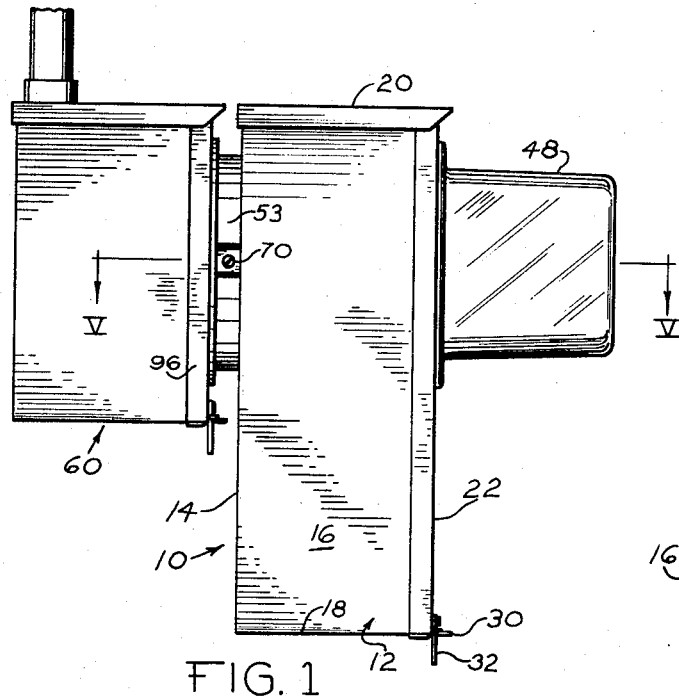
FIG. 1 is a side, elevational view of a voltage recorder unit in accord with the invention as mounted upon a permanent meter box, and illustrating the meter mounted upon the recorder unit.

The voltage recorder unit 10 in accord with the invention includes a housing 12, such as formed of sheet metal, but may be formed of fiberglass or other synthetic material. The housing 12 includes a rear wall 14, side walls 16, a bottom wall plate 18, and a top wall 20. Additionally, the housing includes a front cover 22 having a flanged edge 24 overlapping the portions of the side and bottom walls adjacent the front cover. The top wall 20 extends forwardly beyond the cover 22, FIG. 1, and is provided with an inwardly extending lip 26, FIG. 4, and the front cover is provided with an outwardly extending flange 28, FIG. 4, for overlapping the lip 26 whereby a limited hinging of the front cover with respect to the lip is possible, and upon the lower portion of the cover 22 being pivoted a predetermined distance from the bottom wall 18 the front cover may be removed completely from the lip and the housing. The construction of the lip 26 and flange 28, and hinging operation of the front cover 22 relative to the other components of the housing 12 is a common construction in meter boxes, and forms no part of the present invention.

Figure 4:
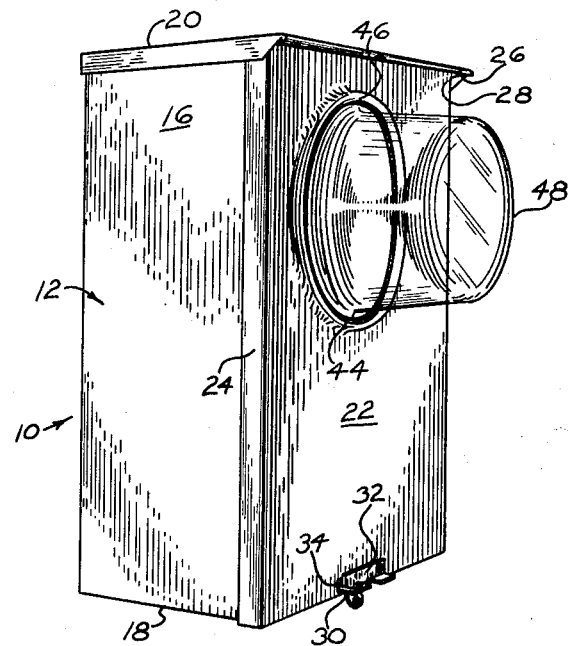
FIG. 4 is a front and side perspective view of the unit illustrating a meter mounted upon the unit and extending from the front cover.

A locking bracket extension 30 is mounted upon the housing bottom wall 18, and a pivoted lever 32 mounted on cover 22, FIG. 4, is adapted to be inserted through an opening in the bracket when the cover is in place and the bracket extends through opening 34 in the cover whereby a lock, or sealed wire may be inserted through the hole in the lever to prevent unauthorized removal of the cover 22 from the housing 12 in the manner well known in the meter box art.

With reference to FIG. 5, the housing rear wall 14 is provided with an opening 36, and a U-shaped sheet metal mounting bracket 38 is mounted upon the interior side of the rear wall 14 upon which the unit meter socket 40 is mounted. Meter mounting brackets 42 are mounted upon each of the side walls 16, FIGS. 2 and 5, and include an arcuate surface adapted to engage and position a meter when mounted upon the unit 10. The cover 22 is provided with an opening 44, having an annular flange portion 46, FIG. 5, for cooperating with a meter 48 in the manner appreciated from FIG. 5.

Figure 3:
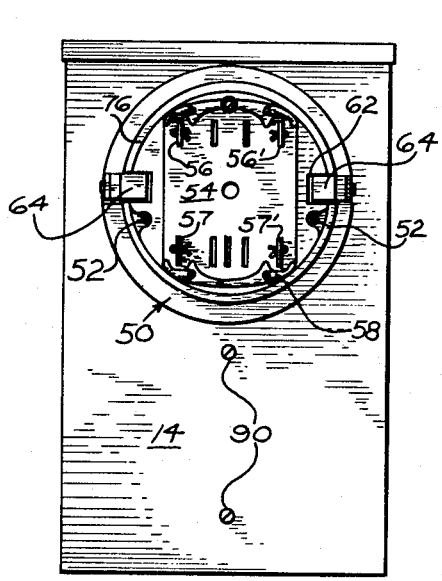
FIG. 3 is a rear, elevational view of the unit illustrating the adapter.

The adapter 50 is mounted upon the housing 12 by screws 52, FIG. 3, which extends through the rear wall 14, and the adapter is mounted upon the exterior of the rear wall over the opening 36. The adapter includes a metal ring base 53 and a dielectric body 54 which may be formed of a synthetic electrically insulating material, and four blade type terminals 56 and 56', and 57 and 57', comprising first and second terminal sets, are mounted upon the adapter for cooperation with the terminal sockets of a conventional electric watthour meter socket. The blade terminals are mounted by cotter pins and stops defined thereon. Alignment projections 58 are defined upon the adapter from the body material located adjacent the blade terminals and the spacing between the terminals is such that the adapter may be readily "plugged into" a conventional NEMA standard, four terminal, single phase, three wire meter socket as mounted upon a permanent meter box 60 used in an electrical distribution system for 220 volt AC service.

The adapter 50 is provided with a pair of openings 62, each of which receive a locking member 64 of an F-shape, FIG. 5, movably mounted upon the adapter in a radial direction. The members 64 each include a finger 66, and a finger 68 whereby the adapter may be used with either ringless type or ring type meter sockets. The finger 66 permits use of the adapter with ringless type sockets, while the finger 68 permits use with ring type sockets, the ringless type socket interconnection is illustrated in dotted lines in FIG. 5. Threaded machine screws 70 are rotatably mounted within the adapter ring 53, and are held against axial displacement by a snap ring 72, FIG. 5. The screws 70 cooperate with threaded holes defined in the locking members 64 such that rotation of the screws radially displaces the members 64 and the fingers 66 or the fingers 68 may be moved into an overlapping relationship with the meter box or socket ring upon a permanent meter box for locking the adapter, and voltage recorder unit, to the associated meter box.

Connection of the adapter 50 to the permanent meter box 60 is accomplished by radially moving the members 64 to either interpose the service meter box cover between fingers 66 and adapter body surface 74, in a ringless type installation, or grip a meter socket ring, not shown, between fingers 68 and adapter body surface 76. Holes may be drilled in the heads of screws 70 to permit sealing wires or locks to be inserted through the screws to discourage tampering. The adapter 50 may be of the type construction available from Ekstrom Industries Inc. of Farmington, Mich.

The meter socket 40 is mounted within the chamber defined by the housing 12 upon the bracket 38. The meter socket 40 is formed of a dielectric material such as porcelain or a synthetic plastic composition and is mounted upon the bracket by a pair of screws 78. The socket includes four socket type electrical terminals 80 and 80' constituting a set, and terminals 82 and 82' constitute another set of socket terminals. The terminals 56, 56', 57, 57', 80, 80', 82 and 82' each have conductor mounting screws directly associated therewith whereby wire conductors may be electrically connected to each terminal. The meter socket 40 conforms to NEMA standards for four terminal, three wire, single phase sockets.

Figure 2:
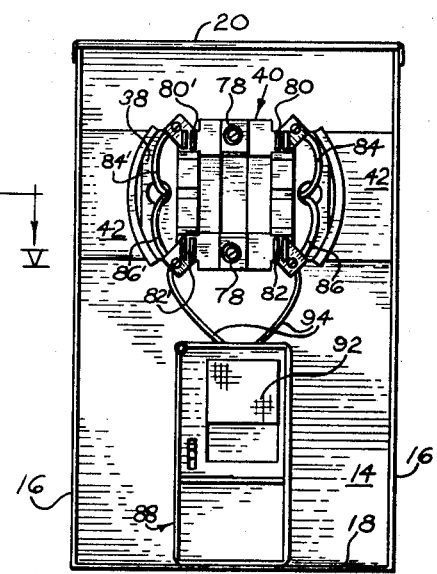
FIG. 2 is a front, elevational view of a voltage recorder unit in accord with the invention, the front cover being removed, and a meter not in place upon the unit meter socket.

The terminals 56 and 80, and 56' and 80' are electrically interconnected by wire conductors 84 and 84', respectively, FIG. 2, while the terminals 57 and 82, and 57' and 82' are electrically interconnected by wire conductors 86 and 86', respectively, FIGS. 2 and 5. The wire conductors consist of heavy gauge electrically insulated cable, and in this manner the blade terminals 56 and 56' define input terminals supplying the socket terminals 80 and 80', and the blade terminals 57 and 57' define output terminals interconnected to the socket terminals 82 and 82'.

A recording type voltmeter 88 is mounted within the housing 12 below the socket 40. The recording voltmeter is mounted to the rear wall 14 of the housing by screws 90, FIG. 3, and the voltmeter includes a movable chart 92 upon which the sensed voltage is indicated. The voltmeter includes input conductors 94 which are connected to the socket terminals 82 and 82', and a ground conductor is connected to a ground cable on the socket.

The recording voltmeter 88 is of a miniature type, and may be either single channel, or dual channel, depending on whether the voltages of one or both power supply lines are to be recorded. In most installations a dual channel recorder will be utilized as most domestic power supplies are of the 220 volt AC type, and a voltmeter channel is connected to each 110 volt AC circuit.

Preferably, the voltmeter 88 is either a Model 236A, single channel, or Model 236B, dual channel, as manufactured by Rustrak Instrument Division of Gulton Industries Inc., of Manchester, N.H. Recorders of this type are shown in U.S. Pats. No. 3,048,848; 3,129,998 and 3,170,754.

In FIG. 1 a typical permanent service meter box is illustrated at 60, and comprises a housing having a front cover 96 mounted upon the meter box in the well known manner similar to that described with respect to the recorder unit housing 12 and cover 22. An opening 98 is defined in the meter box cover through which the watthour meter extends in the well known manner. Of course, an electric meter socket 100 having terminals 101, as represented in dotted lines in FIG. 5, is mounted within the meter box 60 for receiving the blade terminals of the watthour meter in the known manner.

When the voltage recorder unit 10 in accord with the invention is to be used the watthour meter 48 is removed from the permanent meter box 60, and the adapter 50 is inserted through the opening 98 such that the terminals 56, 56', 57 and 57' are received within the terminals of the socket 100 within the meter box. The screws 70 are then rotated to move the locking members 64 radially outwardly to overlap the meter box cover flange 102 and thereby fixedly mount the unit 10 upon the meter box in electrical connection with the power supply. As will be appreciated in FIG. 5, a ringless type of assembly is shown and the fingers 66 overlap the meter box cover flange 102 preventing the adapter 50 to be withdrawn from the meter box opening and socket.

The voltage recorder unit cover 22 may now be removed from the housing 12, and the watthour meter 48 previously removed from the meter box 60 and socket 100 is inserted into the socket 40 until the base of the meter engages the mounting brackets 42. At this time the blade terminals 104, FIG. 5, of the meter 48 will be received within the socket terminals of the meter socket 4. The cover 22 may now be installed such that the meter 46 extends through the cover opening 44, and the unit will have the appearance illustrated in FIG. 1.

Insertion of the meter 48 into the terminals 80 and 80' and 82 and 82' completes the circuit between the adapter terminals 56 and 57, and 56' and 57', and thus the electrical service is restored to the customer and meter 48 continues to measure the amount of electricity passing through meter box 60.

FIG. 6 schematically illustrates the electrical circuit of a voltage recorder unit installed as described above. The energized electrical service input conductors are represented at 103 and the output conductors connected to the customer's distribution system are indicated at 105. Of course, grounding conductors are also a part of the circuit, but are not shown, except for the ground connection of the voltmeter 88.

The voltage at the unit 10 is monitored by the voltmeter 88, and registered upon the chart 92, wherein voltage variations are permanently recorded. While the meter 88 is connected to the "output" side of the socket 40 and meter 48, it will be appreciated that the voltmeter 88 could likewise be connected to the "input" side of the socket and meter and still provide effective monitoring.

As the adapter 50 is locked to the meter box 60 by fingers 66, and as the recording unit cover 22 will be locked to the recording unit housing 12 by the lock extension 30 and lever 32 either by padlock or sealed wire, and as the meter 48 and all of the electrical conductors, terminals and interconnections are enclosed within the housing 12, and only the meter 48 projects from the housing, the entire voltage recording unit is self-contained and self-enclosed, and not readily susceptible to tampering and vandalism, and yet the meter 48 is readily visible for reading purposes.

When it is desired to remove the voltage recording unit 10 from the meter box 60, the cover 22 is removed from the housing 12, and the watthour meter 48 is removed from the socket 40. Thereupon, the screws 70 are rotated to displace the fingers 66 inwardly to release the adapter 50 from the meter box cover 96, and the adapter may then be pulled from the meter box opening 98 and socket 100. The meter box cover 96 is then opened and the watthour meter 48 reinserted into the meter box socket 100, and the meter box cover replaced to complete the return of the system to its normal state.

It will be appreciated that no special skills are required to install and disassemble the voltage recorder unit to the meter box 60, and the unit of the invention permits use by personnel having the ordinary skills of electric utility employees.

A modification of a meter socket voltage recorder unit in accord with the invention is illustrated in FIGS. 7 and 8 wherein components similar to those previously described are identified by primed, double primed and triple primed reference numerals.

The housing 12' is identical to the housing 12 previously described, and in FIG. 7 the housing cover 22', and meter 48' are illustrated, the latter in dotted lines.

In the embodiment of FIGS. 7 and 8 the unit adapter and meter socket constitute portions of a two-piece cylindrical support member 106 formed of a synthetic, moldable, dielectric material.

The adapter portion 108 and the socket portion 110 are each of a dished configuration including a circular side wall and an end wall. The adapter portion 108 includes four thickened peripheral side wall portions 112 in which holes 114 are defined for receiving screws 116, and in a like manner the side wall of the socket portion 110 is provided with thickened wall portions 118 having threaded holes 120 for receiving the screws 116. The screws 116 extend through holes 122 defined in the housing rear wall 14' and the assembly of the screws to the adapter and socket portions will fix the portions to the housing 12' in a positive manner.

Locking of the adapter portion 108 to a meter box is accomplished in a manner similar to the previously described embodiment. A pair of radially disposed screws 124 diametrically related to each other are rotatably mounted within the adapter portion 108 and threadily associate with F-shaped locking members 64' located in opening 126 wherein rotation of the screws 124 radially displaces the locking members inwardly and outwardly in order to overlap the meter box cover, or socket ring, as previously described. Also, the adapter portion includes the alignment projections 58' defined thereon of the material of the adapter portion.

The construction of the terminals of the adapter portion 108 and the socket portion 110 will be appreciated from FIG. 7 wherein an adapter blade terminal 56'', for instance, constitutes an end of a substantially rigid bus bar 128 having socket terminal 80'' defined at the other end. The socket terminals include the resilient fingers 130 similar to that employed with the meter socket 40 of the previously described embodiment, and the bus bar 128 extends through slots defined in the socket portion end wall, and the adapter portion end wall. The blade terminal end of the bus bars 128 are an integral part of the bus bar and the socket terminal ends of the bus bar, including fingers 130, are also an integral part of the bus bar. The fingers 130 may be formed separately with respect to the bus bar but are permanently connected thereto by welding or other mechanical connection. Holes formed in the bus bars 128 adjacent the outer surface of the adapter portion 108 receive cotter pins 132 to prevent axial displacement of the bus bars, and the associated terminals.

The voltmeter recorder, not shown, used with the embodiment of FIGS. 7 and 8 is identical to that employed with the previously described embodiment, and the input conductors of the voltmeter recorder are electrically connected to either the upper or lower sets of socket terminals or bus bars.

The voltage recorder unit disclosed in FIGS. 7 and 8 is used identically to that described with respect to the previous embodiment. HOwever, the construction of the components of the embodiment of FIGS. 7 and 8 reduces the cost and manufacturing techniques required, and further simplifies assembly of the unit due to the use of the screws 116 to assemble both the adapter and socket portions, and the use of the bus bar construction to define the terminals of the adapter and socket portions, while simultaneously minimizing the likelihood of short circuits due to frayed or cut conductors interconnecting the terminals of the unit.

It is appreciated that various modifications may be apparent to those skilled in the art without departing from the spirit and scope of the invention.

I claim:

1. A voltage recorder unit for use with an electric watthour meter socket comprising, in combination, a housing having a rear wall and defining an interior chamber, meter socket adapter means adapted to be received within an electric meter socket mounted on said housing projecting from said rear wall including first and second sets of electrical terminals, meter socket means adapted to receive an electric meter mounted on said housing including third and fourth sets of electrical terminals, first electrical conductor means interconnecting said first and third sets of terminals and second electrical conductor means interconnecting said second and fourth sets of terminals, and voltage recording means mounted within said housing chamber having input conductors electrically connected to said fourth set of terminals sensing the voltage potential at said fourth set of terminals, said first set of terminals constituting the voltage input into the unit, said second set of terminals constituting the voltage output of the unit, whereby an electric meter mounted upon said meter socket means interconnects said terminals of said third set to said terminals of said fourth set.

2. In a voltage recorder unit as in claim 1 wherein said meter socket means is mounted on said housing within said chamber.

3. In a voltage recorder unit as in claim 2, a cover defined on said housing having a meter receiving opening defined therein, said meter socket means being in alignment with said opening whereby an electric watthour meter mounted upon said socket means projects from said housing through said opening, and electric watthour meter mounting means mounted upon said housing adjacent said cover and opening.

4. In a voltage recorder unit as in claim 1, a support member mounted upon said housing having an inner end portion located within said housing and an outer end portion exteriorly extending from said housing rear wall, said meter adapter being defined on said support member outer end portion and said meter socket means being defined on said support member inner end portion.

5. In a voltage recorder unit as in claim 4 wherein said first and second electrical conductor means comprise substantially rigid bus bars integrally defining said first and third sets of terminals and said second and fourth sets of terminals, respectively.

6. A voltage recorder unit for use with an electric watthour meter socket comprising, in combination, a housing having a rear wall, side walls and a removable front cover disposed in opposed relation to said rear wall defining an interior chamber, meter adapter means adapted to be received within an electric meter socket means mounted on said housing projecting from said rear wall, meter socket means mounted on said housing located within said chamber, first and second sets of blade terminals supported upon said adapter means, third and fourth sets of socket terminals supported upon said meter socket means, electrical conductors interconnecting said first and third sets of terminals and said second and fourth sets of terminals, respectively, defining an interconnecting circuit between said meter adapter means and said meter socket means, voltage recording means mounted within said housing chamber having input conductors electrically connected to said interconnecting circuit sensing the voltage thereof, and a meter receiving opening defined in said front cover in alignment with said meter socket means whereby an electrical watthour meter mounted on said socket means extends from said cover through said opening.

7. In a voltage recorder unit as in claim 6, meter mounting means mounted on said housing within said chamber adjacent said meter socket means and said opening.

8. In a voltage recorder unit as in claim 6, a support member mounted upon said housing having an inner end portion located within said housing and an outer end portion exteriorly extending from said housing rear wall, said meter adapter being defined on said support member outer end portion and said meter socket means being defined on said support member inner end portion.

9. In a voltage recorder unit as in claim 8 wherein said electrical conductors defining an interconnecting circuit comprise substantially rigid bus bars integrally forming said first and third sets of terminals and said second and fourth sets of terminals, respectively.

10. In a voltage recorder unit as in claim 6, first locking means mounted upon said meter adapter means for locking said adapter means to an electric meter socket support and second locking means mounted on said front cover locking said front cover to said housing.

* * * * *